US010284645B1

(12) United States Patent
Thiam

(10) Patent No.: US 10,284,645 B1
(45) Date of Patent: May 7, 2019

(54) BACKUP FROM NETWORK ATTACHED STORAGE TO SEQUENTIAL ACCESS MEDIA IN NETWORK DATA MANAGEMENT PROTOCOL ENVIRONMENTS

(71) Applicant: Veritas Technologies LLC, Mountain View, CA (US)

(72) Inventor: Alioune Thiam, Hugo, MN (US)

(73) Assignee: Veritas Technologies LLC, Santa Clara, CA (US)

( * ) Notice: Subject to any disclaimer, the term of this patent is extended or adjusted under 35 U.S.C. 154(b) by 919 days.

(21) Appl. No.: 14/270,508

(22) Filed: May 6, 2014

(51) Int. Cl.
*G06F 13/28* (2006.01)
*G06F 15/167* (2006.01)
*H04L 29/08* (2006.01)
*G06F 17/30* (2006.01)
*G06F 11/14* (2006.01)

(52) U.S. Cl.
CPC ...... *H04L 67/1097* (2013.01); *G06F 11/1448* (2013.01); *G06F 13/28* (2013.01); *G06F 13/287* (2013.01); *G06F 17/30073* (2013.01)

(58) Field of Classification Search
CPC ............. G06F 11/1435; G06F 11/1448; G06F 17/30073; G06F 2009/45562; G06F 2009/45579; G06F 11/1446–11/1469; G06F 3/0682; G06F 13/1694; G06F 13/28–13/287; G06F 2003/0698; H04L 29/08549; H04L 67/1097; H04L 69/40
See application file for complete search history.

(56) References Cited

U.S. PATENT DOCUMENTS

| | | | | |
|---|---|---|---|---|
| 5,423,029 A * | 6/1995 | Schieve | ............. | G06F 11/2221 714/42 |
| 5,901,312 A * | 5/1999 | Radko | .................. | G06F 9/4488 718/104 |
| 6,487,644 B1 * | 11/2002 | Huebsch | ............ | G06F 11/1464 709/203 |
| 6,549,992 B1 * | 4/2003 | Armangau | .......... | G06F 11/1456 707/999.202 |
| 7,127,535 B1 * | 10/2006 | Huebsch | ............ | G06F 11/1464 709/203 |
| 8,225,057 B1 * | 7/2012 | Zheng | ................ | G06F 11/1458 711/114 |
| 9,229,740 B1 * | 1/2016 | Allen | ........................ | G06F 8/65 |
| 2005/0033911 A1 * | 2/2005 | Kitamura | ............. | G06F 3/0607 711/111 |
| 2005/0044163 A1 * | 2/2005 | Kitamura | ........... | G06F 11/1456 709/213 |
| 2005/0108486 A1 * | 5/2005 | Sandorfi | ............ | G06F 11/1448 711/162 |

(Continued)

Primary Examiner — Brendan Y Higa
(74) Attorney, Agent, or Firm — Campbell Stephenson LLP

(57) ABSTRACT

Various systems and methods for backing up multiplexed backup data streams from a Network Attached Storage (NAS) device to a sequential access media device are disclosed. One such method involves creating multiple identities of the sequential access media device on a server. A portion of a memory of the server is allocated to each respective identity of the sequential access media device. A backup data stream from the NAS device is written to each allocated portion of the memory. Data written to each allocated portion of the memory is multiplexed for transmission to the sequential access media device for storage.

22 Claims, 8 Drawing Sheets

(56) References Cited

U.S. PATENT DOCUMENTS

| | | | | |
|---|---|---|---|---|
| 2007/0214384 A1* | 9/2007 | Kitamura | ............ | G06F 11/1464 714/13 |
| 2008/0043732 A1* | 2/2008 | Desai | ............ | H04L 49/109 370/389 |
| 2008/0072002 A1* | 3/2008 | Kuwahara | ............ | G06F 11/1456 711/162 |
| 2009/0313399 A1* | 12/2009 | Lingam | ............ | G06F 13/28 710/26 |
| 2010/0057790 A1* | 3/2010 | Johnson | ............ | G06F 3/0605 707/E17.007 |
| 2010/0077160 A1* | 3/2010 | Liu | ............ | G06F 3/0482 711/162 |
| 2010/0180074 A1* | 7/2010 | Slater | ............ | G06F 3/0607 711/111 |
| 2011/0099301 A1* | 4/2011 | Moallem | ............ | G06F 11/25 710/22 |
| 2011/0289561 A1* | 11/2011 | Ivanov | ............ | G06F 11/1464 726/4 |
| 2012/0005468 A1* | 1/2012 | Yu | ............ | G06F 11/1417 713/2 |
| 2012/0084523 A1* | 4/2012 | Littlefield | ............ | G06F 11/1469 711/162 |
| 2013/0031570 A1* | 1/2013 | Natrajan | ............ | G06F 3/0605 719/326 |
| 2014/0229695 A1* | 8/2014 | Dinkar | ............ | H04L 67/1004 711/162 |
| 2014/0281072 A1* | 9/2014 | Yang | ............ | G06F 13/14 710/106 |
| 2015/0052176 A1* | 2/2015 | Akaike | ............ | G06F 17/30132 707/812 |
| 2015/0058863 A1* | 2/2015 | Karamanolis | ............ | G06F 9/5083 718/105 |
| 2015/0106343 A1* | 4/2015 | Srinivasan | ............ | G06F 17/30371 707/692 |

* cited by examiner

300

| Header Map 85 | | | | |
|---|---|---|---|---|
| Block | NDMP Filer | Pseudo SAM | Emulated Offset | Real Offset |
| #950 | 45(1) | 15(1) | 0-100 | 901-1000 |
| #125 | 45(2) | 15(2) | 0-200 | 1-200 |
| #700 | 45(3) | 15(3) | 0-300 | 601-900 |
| #475 | 45(4) | 15(3) | 0-400 | 201-600 |
| ⋮ | ⋮ | ⋮ | ⋮ | ⋮ |

BACKUP FROM NETWORK ATTACHED STORAGE TO SEQUENTIAL ACCESS MEDIA IN NETWORK DATA MANAGEMENT PROTOCOL ENVIRONMENTS

FIELD OF THE INVENTION

This invention relates to data storage, and more particularly, to multiplexing and storing data from network attached storage to sequential access media.

DESCRIPTION OF THE RELATED ART

Network Data Management Protocol (NDMP), is a protocol used to transport data between Network Attached Storage (NAS) devices and backup storage devices. NDMP removes the need for transporting data through a backup server and thus enhances the speed of backup operations. NAS devices reside on a network with the primary purpose of providing file services. NAS devices that use standard operating systems (for example, Windows-powered NAS devices) support the installation of backup agents and can therefore be backed up like any other file server. However, some NAS devices use custom operating systems that do not support third party backup agents. In these situations, NDMP acts as a backup standard for NAS devices that do not support installation of a backup agent.

State of the art tape storage devices can typically stream data faster than client agents can create backup data streams. Therefore, multiple data streams can be sent to and effectively processed by a given tape storage device. However, these backup data streams are often much slower than the tape storage device consuming and writing the stream. Although NDMP technology supports a local (for example, a Storage Area Network (SAN) attached) backup to a tape storage device, it does not support multiplexing for local backup solutions (for example, in network environments involving multiple backup data streams from a NAS device requiring multiplexing to take advantage of a fast tape storage device).

SUMMARY OF THE INVENTION

Various systems and methods for backing up multiplexed backup data streams from a Network Attached Storage (NAS) device to a sequential access media device are disclosed. One such method involves creating multiple identities of the sequential access media device on a server. A portion of a memory of the server is allocated to each respective identity of the sequential access media device. A backup data stream from the NAS device is written to each allocated portion of the memory. Data written to each allocated portion of the memory is multiplexed for transmission to the sequential access media device for storage.

In some embodiments, data stored in each allocated portion involves dedicating a Direct Memory Access (DMA) channel to each backup data stream and assigning a portion of the memory to the DMA channel based on the association between the backup data stream written to the allocated portion of the memory and the DMA channel dedicated to the backup data stream. A packet identifier associated with each backup data stream (with a dedicated DMA channel) is written to the memory. The memory is then mapped to the sequential access media device.

In other embodiments, the server and the NAS device are coupled through a network. The sequential access media device and the server are also coupled through the network. An NDMP filer is added to a backup application resident on the server as a network-connected agent. The identity of the sequential access media device is exported to the NDMP filer over the network. Data written to each allocated portion of the memory of the server is multiplexed, and the multiplexed data is transmitted to the sequential access media device using a DMA controller.

In one embodiment, creating the identities of the sequential access media device on the server is performed at a transport level of the server, and the multiplexing of the data stored in each allocated portion of the memory for transmission to the sequential access media device for storage is a Peripheral Component Interconnect (PCI)-level multiplexing. The memory of the server is configured at a front end and at a back end. The backup data streams from the NAS device (from each NDMP filer) are identified at the front end. The back end is mapped to the DMA channel dedicated to the backup data stream (from each NDMP filer).

In one or more embodiments, the identity of the sequential access media device is discovered by the NDMP filers of the NAS device by virtue of the server receiving an NDMP command from the NDMP filers. The response from the server to the NDMP command from the NDMP filers contains the created identities of the sequential access media device.

The foregoing is a summary and thus contains, by necessity, simplifications, generalizations and omissions of detail; consequently those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features and advantages made apparent to those skilled in the art by referencing the accompanying drawings.

Figure 1A:
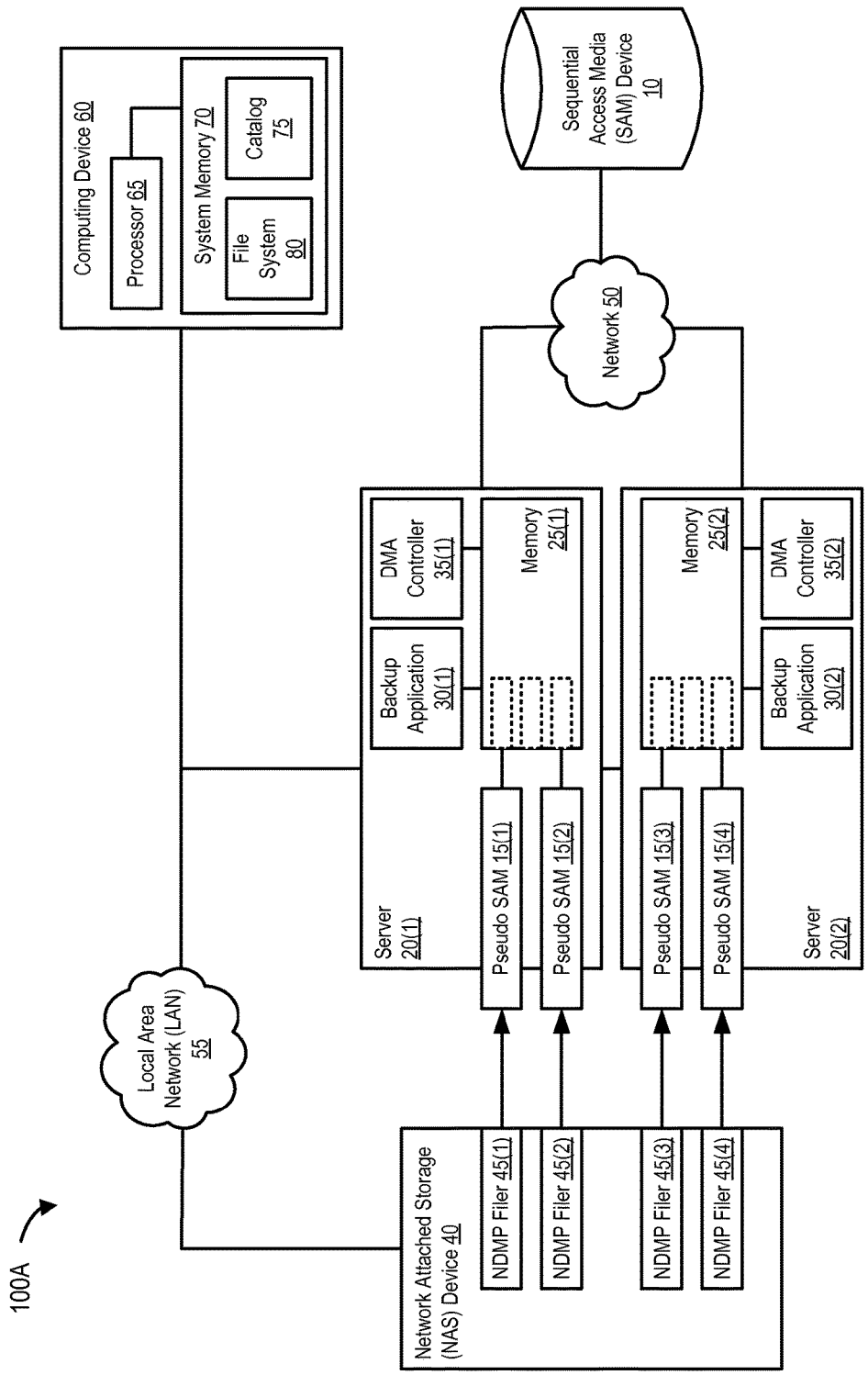
FIG. 1A is a block diagram of a server that implements multiplexing in a Network Data Management Protocol (NDMP) environment, according to one embodiment of the present invention.

While the invention is susceptible to various modifications and alternative forms, specific embodiments of the invention are provided as examples in the drawings and detailed description. It should be understood that the drawings and detailed description are not intended to limit the invention to the particular form disclosed. Instead, the intention is to cover all modifications, equivalents and alternatives falling within the spirit and scope of the invention as defined by the appended claims.

DETAILED DESCRIPTION

Introduction

FIG. 1A is a block diagram of servers 20(1) and 20(2) that implement Network Data Management Protocol (NDMP) multiplexing, according to one embodiment of the present invention. The system includes a Network Attached Storage (NAS) device 40 that contains and implements one or more NDMP filers (shown as 45(1), 45(2), 45(3) and 45(4)). Server 20(1) emulates one or more pseudo-identities of a Sequential Access Media (SAM) device 10 (shown as Pseudo SAM 15(1) and 15(2)). Server 20(1) also includes a memory 25(1) (for example, a peripheral memory), a backup application 30(1) and a Direct Memory Access (DMA) controller 35(1). The same configuration is present in server 20(2). As shown, both servers 20(1) and 20(2) are coupled to sequential access media device 10 through a network (for example, a Storage Area Network). NAS device 40 and servers 20(1) and 20(2) are also coupled to a computing device 60 through Local Area Network (LAN) 55.

Computing device 60 includes a processor 65 and a system memory 70 which implements a file system 80 and stores a catalog 75. Computing device 60 can be any of a variety of different types of computing devices or nodes, including a server, personal computing device, laptop computer, net book, personal digital assistant, cellular phone, or the like. In this example, computing device 60 implements file system 80. File system 80 is a software program that organizes and controls access to files. Here, file system 80 controls access to the files managed by backup applications 30(1) and 30(2) and stored on sequential access media device 10. File system 80 can maintain metadata that identifies (e.g., by a file name) each file (including directories, which are special files that can act as containers for one or more other files), as well as each file's location on a sequential access media device, each file's size, and other information such as the file's creation time, most recent access time, and the like. Such information can be maintained in an inode structure for certain types of files systems.

The term "file system" can refer to both the software application (which itself can be part of an operating system or database) that organizes the files and the collection of files that are organized by that application. Files can be organized hierarchically, with directories collecting groups of files and/or other directories. A file system application like file system 80 can provide another application, such as a DBMS application, with access to files (e.g., to open, read, modify, create, delete, and otherwise interact with the data within the files).

Servers 20(1) and 20(2) and sequential access media device 10 can be integrated (e.g., where the sequential access media device is coupled to the server's internal processing devices by an internal bus and is built within the same chassis as the rest of the node) or separate. If separate, servers 20(1) and 20(2) and sequential access media device 10 can be coupled by a local connection (e.g., using a technology such as Bluetooth™, Peripheral Component Interconnect (PCI), Small Computer System Interface (SCSI), or the like) or (as shown in this example) via one or more networks such as the Internet or network 50.

A backup application such as backup application 30(1) also tracks how the files it organizes map to the blocks (of data) within the sequential access media device in catalog 75. This way, when an application such as a database requests access to a particular file (e.g., using the file name of the file), the backup application in conjunction with catalog 75 can translate that request into a request for the particular blocks of data included in the requested file. Accordingly, the backup application knows which blocks of data originating from NAS device 40 and stored in sequential access media device 10 belong to each file. Each block is a unit of data. In some embodiments, blocks are fixed-size units of data that represent the smallest granularity of data that can be manipulated by the backup application, sequential access media device, and/or operating system. In other embodiments, blocks can be variably-sized, can represent a larger granularity than the smallest representable by the file system, and/or have other, different characteristics than specified here.

Network Attached Storage (NAS) is a file-level computer data storage connected to a computer network providing data access to a heterogeneous group of clients. NAS not only operates as a file server, but is specialized for this task either by its hardware, software, or configuration of those elements. NAS if often manufactured as a computer appliance—a specialized computer built from the ground up for storing and serving files—rather than simply a general purpose computer being used for the role. NAS systems are networked appliances which contain one or more hard drives, often arranged into logical, redundant storage containers. NAS removes the responsibility of file serving from other servers on the network. NAS devices typically provide access to files using network file sharing protocols such as Network File System (NFS) or Common Internet File System (CIFS).

Accordingly, a NAS device (such as NAS device 40) is a computer connected to a network that provides only file-based data storage services to other devices on the network. Although it may technically be possible to run other software on a NAS device, a NAS device is not designed to be a general purpose server. For example, NAS devices usually do not have a keyboard or display, and are controlled and configured over a network, often using a browser. Therefore, a full-featured operating system is not needed on a NAS device, so often a stripped-down operating system is used. NAS provides both storage and a file system (for example, file system 80 accessible to NAS device 40 over LAN 55 as shown in FIG. 1A). By contrast, SAN only provides block-based storage and leaves file system concerns on the "client" side.

Because NAS devices are normally provisioned as storage appliances, they do not permit third party vendors to implement and run backup software and/or applications on the (NAS) devices. In a NAS device, the management of files (for example, files of the data layout) is handled by filers (for example, NDMP filers 45(1)-45(4)). Therefore, because a user performing data backup has to use a file-level protocol to access the NAS device, the NAS device is not an efficient system to perform big data transfers. In today's enterprise storage marketplace, storage vendors are usually are disk vendors—they only provide front end storage that enables an enterprise client to access storage (for example, by provisioning a NAS device). Data backup is generally a secondary consideration to disk vendors. Moreover, because a NAS device is a file system device (and therefore requires its own operating system), storage vendors are not equipped to implement and run backup application software on NAS devices.

A solution to the problem of the physical separation between storage access and storage backup would be for the storage vendor to provide both storage access and storage backup services. This solution is typically implemented by using a common network data transfer protocol (for example, NFS and CIFS discussed above). However, using network data transfer protocols such as NFS and CIFS disrupts the storage system's production environment. NFS is incapable of backing up CIFS Access Control Logs (ACL) and CIFS clients require the proper credentials to access a NAS device's filers. Moreover, selection of a proxy client is a challenge because the home directory may not always be mounted.

Another protocol used to address the limitations of NFS and CIFS is the Network Data Management Protocol (NDMP). NDMP is an open protocol used to control data backup and recovery communications between primary and secondary storage in a heterogeneous network environment. NDMP specifies a common architecture for the backup of network file servers and enables the creation of a common agent that a centralized program can use to back up data on file servers running on different platforms. By separating the data path from the control path, NDMP minimizes demands on network resources and enables localized backups and disaster recovery. With NDMP, heterogeneous network file servers can communicate directly to a network-attached sequential access media device for backup or recovery operations. Without NDMP, administrators must remotely mount NAS volumes on their server and back up or restore the files to directly attached sequential access media devices.

NDMP addresses a problem caused by the particular nature of NAS devices. NAS devices are not connected to networks through a central server, and therefore NAS devices require their own operating systems. Because NAS devices are dedicated file servers, they are not intended to host applications such as backup application 30(1). Consequently, administrators have to amount every NAS volume by using either NFS or CIFS from a network server that does host a backup application. However, this cumbersome method causes an increase in network traffic and degradation of performance. NDMP uses a common data format that is written to and read from the drivers for the various devices.

In enterprise storage environments (for example, banking institutions) requiring a large amount of storage space, a tape storage device, which is a type of sequential access media device, provides cost effective and speedy storage performance. A sequential access media device uses sequential access memory and reads data in a sequence. While sequential access memory is read in sequence, accesses can still be made to arbitrary locations by "seeking" to the requested location. This operation, however, is often relatively inefficient. Sequential access memory is typically used for secondary storage in general-purpose computers due to its higher density at lower cost compared to random access memory (RAM), as well as resistance to wear and non-volatility. State of the art tape storage devices can typically stream data faster than client agents can create backup data streams. Therefore, multiple data streams can be sent to and effectively processed by a given tape storage device. However, these backup data streams are often much slower than the tape storage device consuming and writing the stream.

Unfortunately, in a storage backup environment involving NAS devices and one or more sequential access media devices (for example, tape storage devices), implementing and using NDMP for data backup is not without its limitations. For instance, although NDMP supports a local (for example, Storage Area Network (SAN) attached) backup to a tape storage device, it does not support multiplexing for local backup solutions (for example, in storage backup environments involving multiple backup data streams from an NAS device requiring multiplexing to take advantage of a fast tape storage device).

An Example of Multiplexing for Sequential Storage in an NDMP Environment

Disclosed herein, are example embodiments of multiplexing and backing up backup data streams from a NAS device to a sequential access media device. In some embodiments, NDMP multiplexing concurrently writes multiple backup data streams to the same sequential access media device from the same client or different clients. NDMP multiplexing is desirable because backup data streams created by a NAS device are often much slower than the sequential access media device consuming and writing the backup data streams. NDMP multiplexing permits several backups to run at the same time writing to the same sequential access media device. This process can reduce the need for multiple sequential access media devices. Backup time can also be reduced by writing concurrent backup data streams to a single sequential access media device. In addition, many sequential access media devices require that data is streamed to them at high transfer rates. When data is not streamed fast enough, the sequential access media devices do not work efficiently and are subject to possible excessive wear. In these situations, NDMP multiplexing is a desired solution.

Figure 1B:
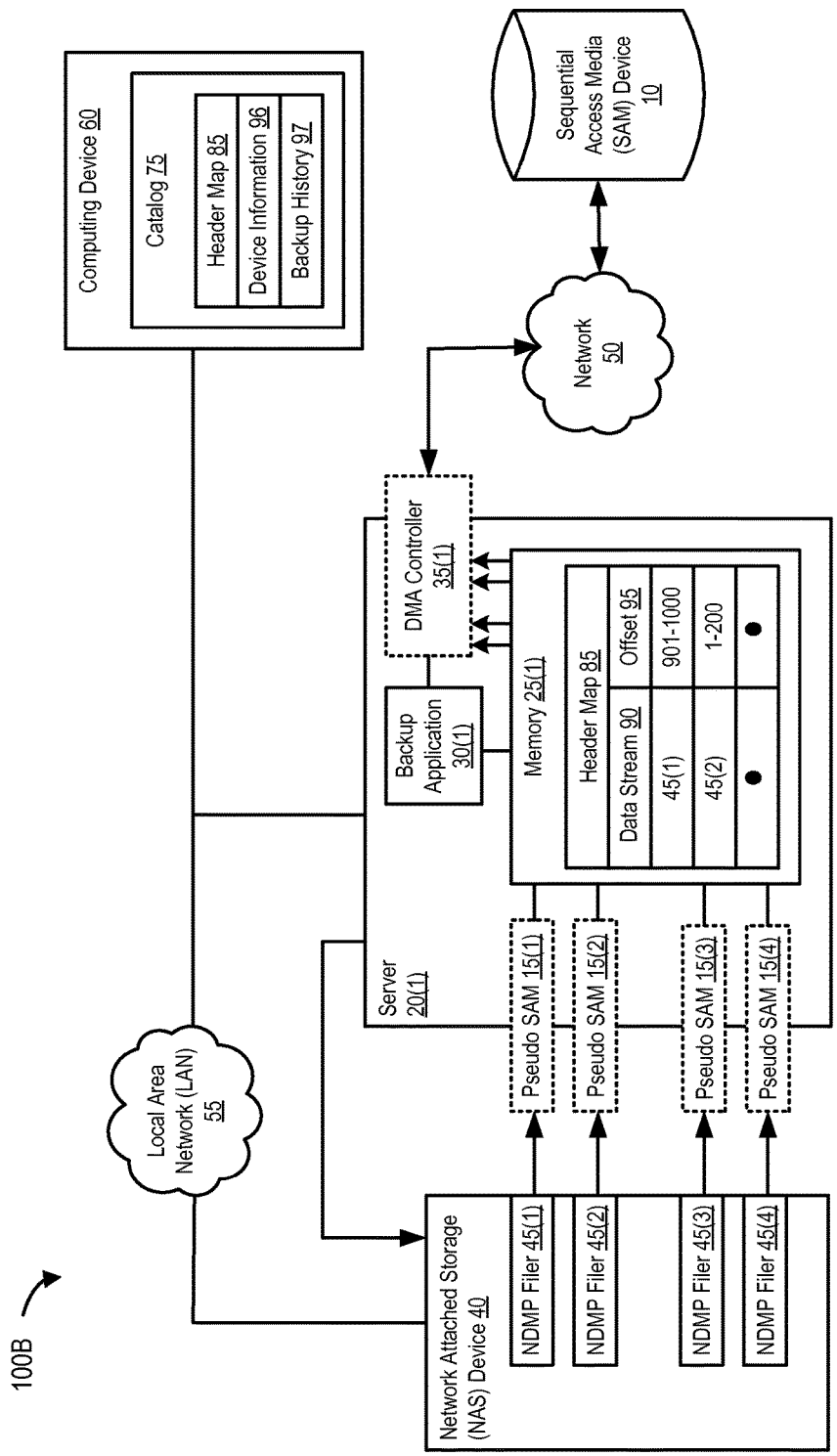
FIG. 1B is a block diagram of a server that writes multiplexed data to a sequential access media device, according to one embodiment of the present invention.

FIG. 1B is a block diagram of a server that writes multiplexed data from a NAS device to a sequential access media device, according to one embodiment of the present invention. NAS device 40 creates multiple backup data streams. Each NDMP filer (for example, NDMP filers 45(1)-45(4)) is responsible for one backup data stream. Although NAS devices support backing up data to a sequential access media device, they only permit data transfer from one backup stream to the sequential access media device at any given time. In one embodiment, backup data streams from NDMP filers 45(1), 45(2), 45(3) and 45(4) are multiplexed in an NDMP-based storage environment by using a target mode driver. In this example, the target mode driver is implemented by servers 20(1) and 20(2) which act as interceptors between NAS device 40 and sequential access media device 10.

Servers 20(1) and 20(2) can be Fiber-Transport (FT) Media Servers (FT backup media servers) on which fiber transport services are activated. Servers 20(1) and 20(2) accept connections (for example, backup data streams) from SAN clients (for example, NAS device 40) and send the backup data streams to sequential access media 10. Servers have host bus adapters (HBAs) that accept backup data streams from NAS devices and use target mode drivers to process, for example, fiber transport data traffic. Servers 20(1) and 20(2) control data flow, process SCSI commands, and manage data buffers for the server side (for example, the front end). The server also manages the target mode driver for the host bus adapters. Servers 20(1) and 20(2), which can be FT media servers, provide high-speed data transportation of backup data streams from a NAS device to a sequential access media device through a network (for example, network 50, which can be a SAN).

One function (out of many) of the server is to mimic and/or emulate (the identity of the) sequential access media device. In some embodiments, when server 20(1) is implemented as an interceptor between NAS device 40 and sequential access media device 10, the target mode driver of server 20(1) is not directly coupled to NAS device 40. Instead, the target mode driver of server 20(1) is coupled to the back end of server 20(1). According to this paradigm, server 20(1) performs at least two functions. First, server 20(1) performs PCI-level multiplexing and subsequently, on the back end, server 20(1) streams multiple backup data streams from NAS device 40 to sequential access media device 10. It should be noted that under this construct, sequential access media device 10 is emulated at the transport level of server 20(1) (rather than at the disk level or storage level of server 20(1)).

In some embodiments, the number of emulations and/or identity creations of sequential access media device 10 is equal or greater to the number of backup data streams emanating from and/or being created by NAS device 40. Because NAS device 40 does not permit the writing of multiple backup data streams to the same sequential access media device, sequential access media device 10 is emulated to match or exceed the number of backup data streams produced for backup and writing by the various NDMP filers on NAS device 40. Therefore, by providing each NDMP filer with a unique pseudo identity of sequential access media device 10, server 20(1) provides the impression to NAS device 40, that NAS device 40 has access to the entire sequential access media device. In reality, because of emulation performed at the transport layer of server 20(1), each NDMP filer of NAS device 40 has access to only a portion of sequential access media device.

Figure 2A:
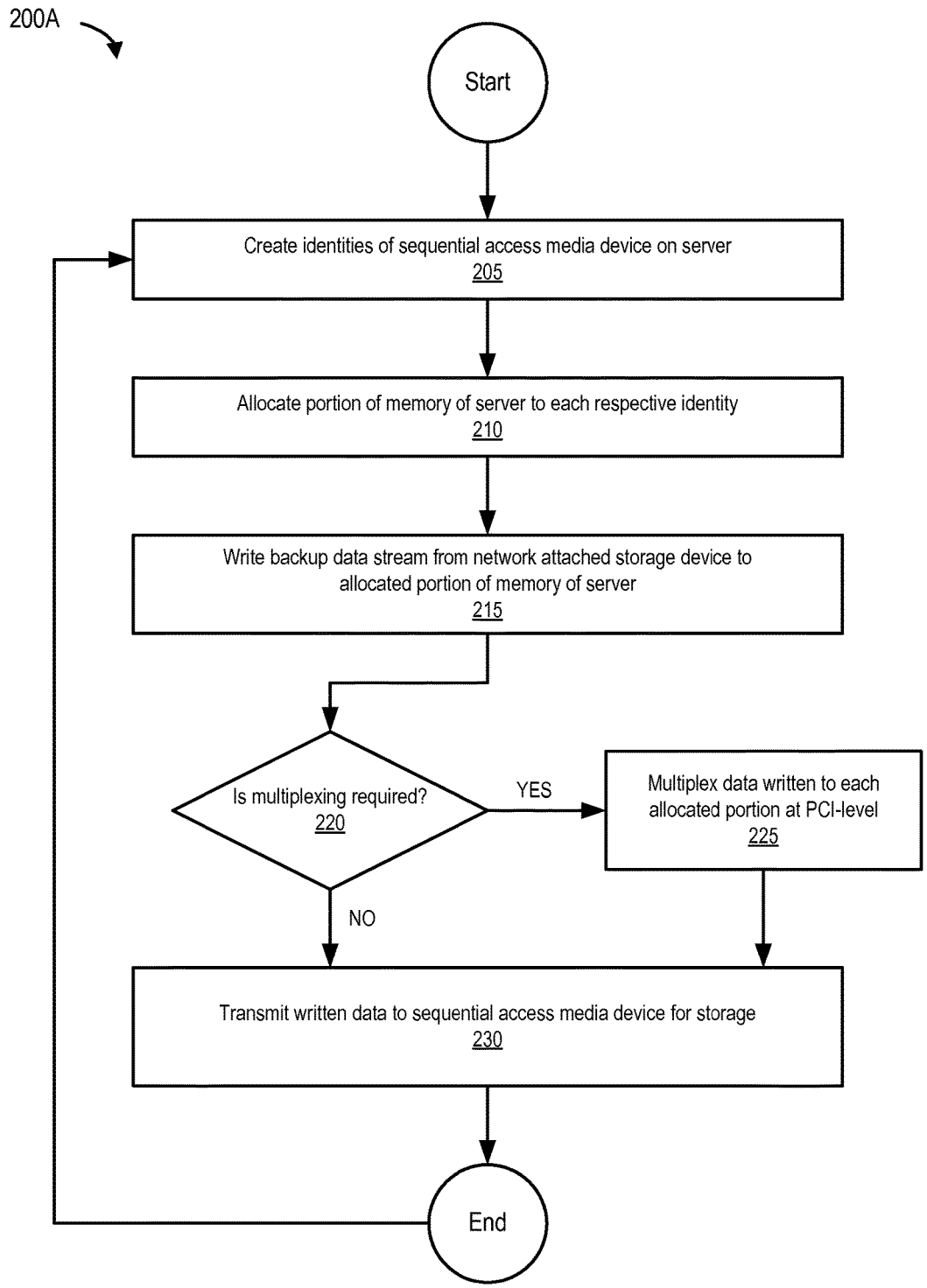
FIG. 2A is a flowchart of a method of backing up data from a NAS device to a sequential access media device, according to one embodiment of the present invention.

FIG. 2A is a flowchart of a method of backing up data from a NAS device to a sequential access media device, according to one embodiment of the present invention. The method begins at 205 by creating identities of sequential access media device 10 on server 20(1) (or server 20(2) of FIG. 1A). The created identities of sequential access media device 10 are pseudo-identities because the real of the identity of sequential access media device 10 is emulated. At 210, the method allocates a portion of memory 25(1) of server 20(1) to the created/emulated respective pseudo identities of sequential access media device 10. At 215, server 20(1) writes various backup data streams from NAS device 40 to allocated portions of memory of server 20(1) (at the transport and/or PCI level—not at the disk and/or storage level).

In some embodiments, the method checks, at 220, whether multiplexing is required. At 225, if required, multiplexing is performed on data written to each allocated portion at the PCI level of server 20(1). It should be noted that the method of FIG. 2A requires PCI level multiplexing—not in-memory multiplexing. The method ends at 230 by transmitting the data written data to sequential access media device 10 through network 50.

Figure 2B:
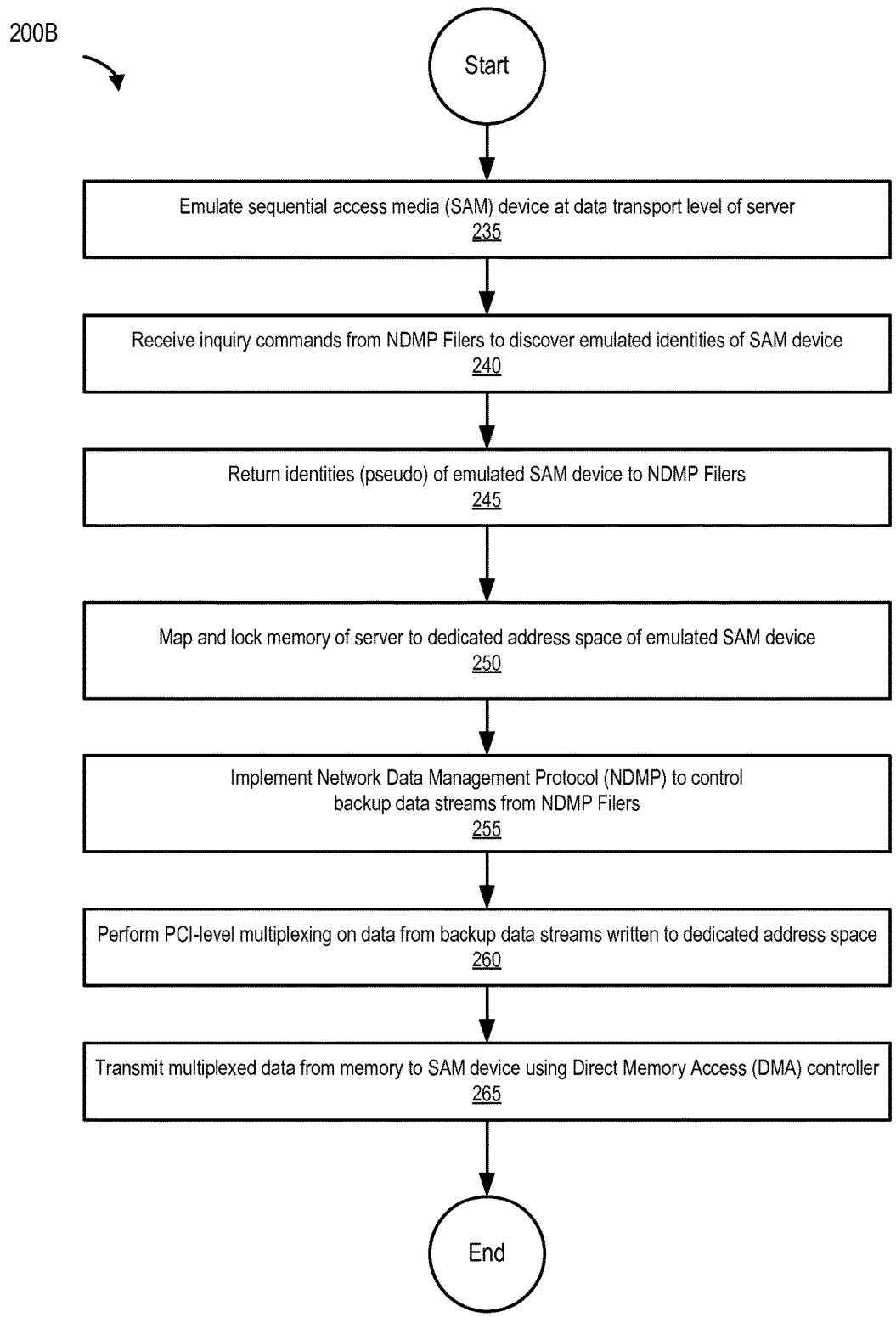
FIG. 2B is a flowchart of a method of creating multiple identities of a sequential access media device at a data transport level, according to one embodiment of the present invention.

FIG. 2B is a flowchart of a method of emulating a sequential access media device at a data transport level, according to one embodiment of the present invention. The method beings at 235 by emulating a sequential access media device only at the data transport level of a server. At 240, the method receives inquiry commands (for example, an NDMP command) from NDMP filers to discover the emulated pseudo-identities of the sequential access media device. At 245, the method returns the pseudo identities of the emulated sequential access media device to the NDMP filers. Then, at 250, the memory of the server is mapped and locked to address space dedicated to the emulated sequential access media device. At 225, NDMP protocol is implemented to control the various backup data streams from the NDMP filers. PCI level multiplexing is performed at 250 on data from backup data streams written to dedicated address spaces. The method ends at 265 by transmitting the multiplexed backup data from the server's memory to the sequential access media device using a DMA controller.

Accordingly, multiplexing data written to the allocated portions of memory, according to one or more embodiments, involves dedicating a direct memory access (DMA) channel to a backup data stream, assigning a portion of the memory to the DMA channel (based on the association between the backup data stream written to the allocated portion and the DMA channel dedicated to the backup data stream), writing a packet identifier associated with the backup data stream dedicated to the DMA channel to the memory, and mapping the memory to the sequential access media device. In this example, the server and the NAS device are coupled through a network (for example, a FT SAN zone) and the sequential access media device and the server are also coupled through a network (for example, a high speed network and/or SAN).

In some embodiments, NDMP filers are added as a storage area network (SAN)-connected agent in a backup application (for example, backup application 30(1)) resident on server 20(1)). The identity of the sequential access media device is exported to the NDMP filers over a network. Data written to each allocated portion is multiplexed at the PCI-level in memory 25(1) of server 20(1), and the multiplexed data is transmitted to the sequential access media device using the DMA controller.

In one embodiment, server 20(1), at the front end, shows NAS device 40 that the front end of server 20(1) is sequential access media device 10 (for example, see pseudo SAM 15(1)-15(4) of FIGS. 1A and 1B). Server 20(1) dedicates a channel (for example, a DMA channel) to a stream from the NDMP filers. For example, pseudo SAM 15(1) is dedicated to NDMP filer 45(1) and so on and so forth. Server 20(1) pre-allocates a mapping memory to PCI and then writes a packet identifier that identifies the backup data stream from the NDMP filer. The PCI is then directly mapped to back end storage (for example, to sequential access media device). In another embodiment, transfer to back end storage is a direct channel transfer.

Accordingly, because multiplexing is performed at the PCI/transport level of the server, the goal of NDMP multiplexing at the PCI/transport level is to make it appear as if the NAS device is writing the various backup data streams from the NDMP filers directly to the sequential access media device (for example, an end tape storage device). In one embodiment, the aforementioned goal can be accomplished by implementing a DMA technique for writing backup data streams from the NAS device to the sequential access media device, and thus the DMA technique (for example, PCI to PCI direct memory transfer) keeps the sequential access media device streaming continuously. PCI-to-PCI direct memory transfer is performed by mapping and/or locking memory 25(1) (which, for example, can be a peripheral memory of server 20(1)) to the address space (pre) allocated and/or assigned for the pseudo identities of the sequential access media device and used by the NDMP filers. In some embodiments, data written by the backup data streams are multiplexed in memory 25(1) and are written and/or transmitted to sequential access media device 10 using the PCI-to-PCI DMA technique.

Figure 2C:
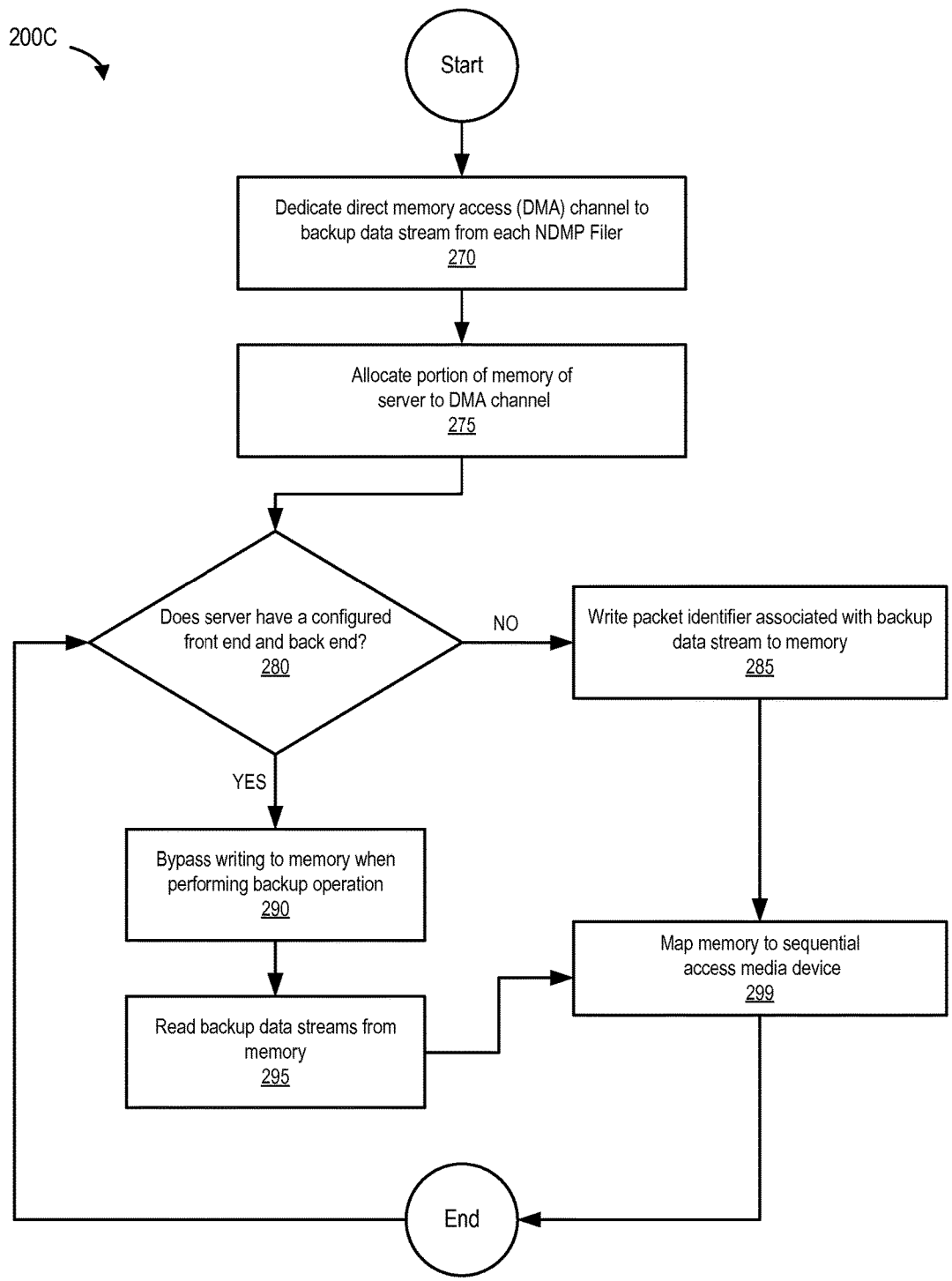
FIG. 2C is a flowchart of multiplexing data written to an allocated portion of memory of a server at a Peripheral Component Interconnect (PCI)-level, according to one embodiment of the present invention.

FIG. 2C is a flowchart of multiplexing data written to an allocated portion of memory of a server at a Peripheral Component Interconnect (PCI)-level, according to one embodiment of the present invention. The method begins at 270 by dedicating a DMA channel to a backup data stream from each NDMP filer of NAS device 40. At 275, a portion of the memory of the server is allocated to the dedicated DMA channel. If the server has a configured front end and back end, at 290, writing to the memory is bypassed when performing a backup operation. The method, at 295, reads backup data streams from memory and maps the memory to sequential access media device 10. If the server does not have a configured front end and back end, at 285, the method writes a packet identifier associated with the backup data stream to memory. The method ends at 299 by mapping the memory to sequential access media device 10.

In some embodiments, each block of data written to sequential access media device 10 has its own header. The server implements offset mapping of informational fragment data which can be helpful in locating a block of data backed up in the sequential access media device. For example, if block A is 256 kilobytes, 512 bytes of the block is designated as a header. The header contains information about which backup data stream block A belongs to, as well as the offset information of block A (for example, the starting offset on sequential access media device 10 that block A has been stored/written to and can be read/recovered from). In one embodiment, server 20(1) adds a header to each block of data of the backup data streams from NAS device 40 before the block of data is multiplexed and transmitted/written to sequential access media device 10. By virtue of writing a header to each block of data, a file can be recovered quickly and efficiently by sequentially going through the sequential access media device and recovering the blocks of data that corresponds to the file based on the block's header (and skipping those blocks of data that do not correspond to the file being sought for recovery).

Figure 3:
FIG. 3 is a table illustrating a header map of blocks stored in, according to one embodiment of the present invention.

FIG. 3 is a table illustrating a header map of the memory of the server, according to one embodiment of the present invention. In some embodiments, the server implements offset mapping which pin-points the location of the backup data streams in the sequential access media device. Having a configured front end and back end of the memory of the server permits bypassing the memory. For example, the back end of the memory is mapped to the sequential access media device and only a read operation is performed from the PCI. In this example, NAS device 40 and sequential access media device 10 share the same overlapping buffer and buffer slowdown is prevented from a simultaneous read and write operation. By using PCI direct memory access, assigning a memory to the PCI of a pseudo identity of a sequential access media device that is assigned to an NDMP filer shows only the assigned and/or allocated portion of the PCI and not the entire memory of the server. When the server starts a backup operation, the backup data that is sent to the sequential access media device contains the backup data stream as well as the aforementioned packet identifier which contains identity information of the backup (for example, the client's name, account number, and other substantive information regarding the data).

The mapping procedure described in relation to FIG. 3 can also be accomplished with a catalog and a configuration file. Catalog 75 (see FIGS. 1A and 1B) is a mapping methodology that maps the content of the server to the sequential access media device. Catalog 75 is stored separately on computing device 60 accessible by Local Area Network (LAN) (for example, LAN 55). Each backup data stream has its own catalog entry. Every time there is a write operation to the sequential access media device, the server transmits a command to the NAS device which informs the NAS device that the NAS device is writing at offset zero. In this example, catalog 75 stores the actual location of the backup data stream in sequential access media device (see FIG. 3) by using metadata. It is envisioned that catalog 75 also contains header information about each block written to sequential access media device (in addition to other substantive information about the block of data such as client information, client name, account information, etc.).

In addition, and as discussed above, a DMA channel is dedicated to a backup data stream from each NDML filer of NAS device 40. DMA allows NAS device 40 to access memory 25(1) of server 20(1) independently of a central processing unit (CPU). In this example, PCI-to-PCI DMA is useful any time NAS device 40 cannot keep up with the rate of data transfer, particular given the speed of modern sequential access media devices. Server 20(1) implements DMA channels and transfers backup data streams from NDMP filers to and from the sequential access media device with much less overhead than computing systems without DMA channels. Similarly, a processing element inside a multi-core processor of a server can transfer data to and from memory without occupying its processor time, allowing computation and data transfer to proceed in parallel.

In some embodiments, memory 25(1) of server 20(1) is divided into two sectors. The backup data streams from the NAS device are identified at the front end and the back end is mapped to the DMA channel dedicated to the backup data streams. In essence, the first half of the buffer of memory 25(1) is written by the NDMP filers and the second half is written by backup application 30(1). In this manner, and according to one embodiment, backup application 30(1) is aware of the transfer of the backup data streams to sequential access media device 10. This front end—back end methodology also helps backup application 30(1) to read the backup data streams and permits backup application 30(1) to distinguish between the various backup data streams. For example, directly mapping memory 25(1) to sequential access media device 10 prevents the various backup data streams from being mixed up because of the sequential and continuous stream of data being written to sequential access media device 10 at very high speed.

It should be noted that, in some embodiments, the server responds to a variety of commands from NAS device 40 (for example, the inquiry command discussed in relation to FIG. 2B above). These commands can include a read-capacity command, a read command, a write command, an inquiry command, an NDMP command, or any other SCSI command, whether mandatory, optional or vendor-specific. For example, the identity of the sequential access media device can be determined by a SCSI inquiry command (which is used to obtain a world wide name, physical characteristics, etc.) and a SCSI read-capacity command can be used to obtain the size of the sequential access media device. In addition, although the present invention only references SCSI and NDMP commands, the present invention envisions any computer command that one or more servers use to read to, write from, and/or access, one or more sequential access media devices.

In one embodiment, the presentation of the emulated/pseudo identity can be achieved by assigning a unique World Wide Name (WWN) or World Wide Identifier (WWID) to a sequential access media device. A WWN is a unique identifier used in storage technologies including Fiber Channel, Advanced Technology Attachment (ATA), Serial Attached SCSI (SAS), and as discussed herein, sequential access media. A WWN may be employed in a variety of roles, such a serial number or for addressability. In this example, a WWN can be used to assign the same identity to a variety of sequential access media devices, including storage sequential access media device 10. A Storage Logical Unit Number (LUN) can also be directly provisioned for each NDMP filer of an NAS device from a Storage Area Network (SAN).

In other embodiments, a WWN, when implemented as a pseudo identity, can be used to mask the identities of multiple sequential access media devices from multiple vendors, and present the identities of the various sequential access media devices in a unified manner to multiple NDMP filers as belonging to the same vendor. Because the server sees the pseudo identity and passes and/or transmits the pseudo identity to the NAS device based on a direct mapping and/or a pass through mapping strategy, even the NAS device starts seeing the identities of multiple sequential access media devices from multiple vendors as a single unified identity associated with same vendor and the same sequential access media device.

An Example Computing Environment

Figure 4:
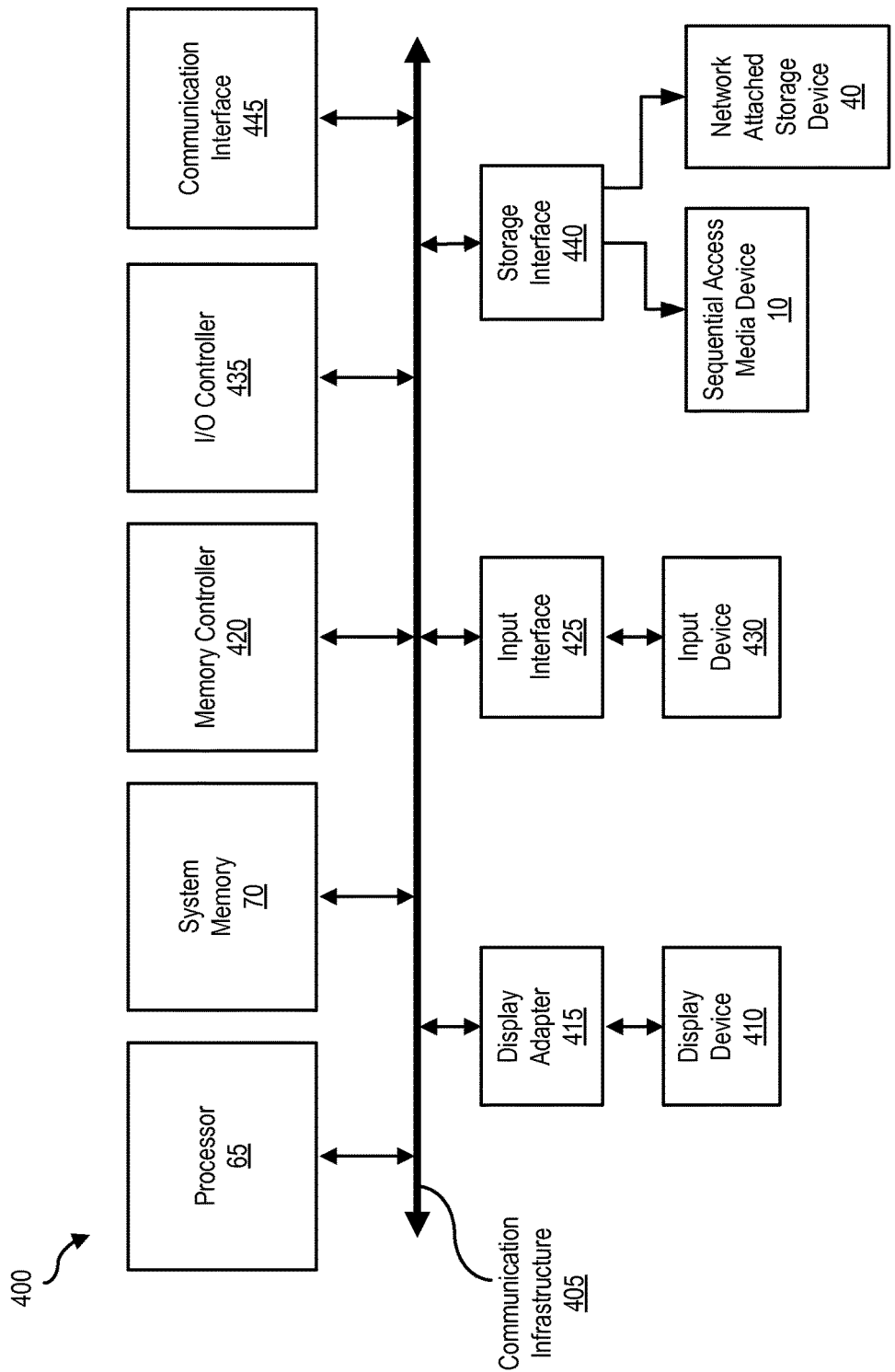
FIG. 4 is a block diagram of a computing device, illustrating how NDMP multiplexing can be implemented in software, according to one embodiment of the present invention.

FIG. 4 is a block diagram of a computing system 400 capable of implementing server 20(1) as described above. Computing system 400 broadly represents any single or multi-processor computing device or system capable of executing computer-readable instructions. Examples of computing system 400 include, without limitation, any one or more of a variety of devices including workstations, personal computers, laptops, client-side terminals, servers, distributed computing systems, handheld devices (e.g., personal digital assistants and mobile phones), network appliances, storage controllers (e.g., array controllers, tape drive controller, or hard drive controller), and the like. In its most basic configuration, computing system 400 may include at least one processor 65 and a system memory 70. By executing the software that implements servers 20(1) and 20(2), computing system 400 becomes a special purpose computing device that is configured to perform a multiplexed NAS backup operation with NDMP to a sequential access media device.

Processor 65 generally represents any type or form of processing unit capable of processing data or interpreting and executing instructions. In certain embodiments, processor 65 may receive instructions from a software application or module. These instructions may cause processor 65 to perform the functions of one or more of the embodiments described and/or illustrated herein. For example, processor 65 may perform and/or be a means for performing all or some of the operations described herein. Processor 65 may also perform and/or be a means for performing any other operations, methods, or processes described and/or illustrated herein.

System memory 70 and memory 25(1) and 25(2) generally represent any type or form of volatile or non-volatile storage device or medium capable of storing data and/or other computer-readable instructions. Examples include, without limitation, random access memory (RAM), read only memory (ROM), flash memory, or any other suitable memory device. Although not required, in certain embodiments computing system 400 may include both a volatile memory unit (such as, for example, memory 25(1)) and a non-volatile storage device (such as, for example, sequential access media device 10 as described in detail below). In one example, program instructions implementing a PCI-level multiplexing operation may be loaded into system memory 70 or memory 25(1)).

In certain embodiments, computing system 400 may also include one or more components or elements in addition to processor 65 and system memory 70. For example, as illustrated in FIG. 4, computing system 400 may include a memory controller 420, an Input/Output (I/O) controller 435, and a communication interface 445, each of which may be interconnected via a communication infrastructure 405. Communication infrastructure 405 generally represents any type or form of infrastructure capable of facilitating communication between one or more components of a computing device. Examples of communication infrastructure 405 include, without limitation, a communication bus (such as an Industry Standard Architecture (ISA), Peripheral Component Interconnect (PCI), PCI express (PCIe), or similar bus) and a network.

Memory controller 420 generally represents any type or form of device capable of handling memory or data or controlling communication between one or more components of computing system 400. For example, in certain embodiments memory controller 420 may control communication between processor 65, memory 70, and I/O controller 435 via communication infrastructure 405. In certain embodiments, memory controller 420 may perform and/or be a means for performing, either alone or in combination with other elements, one or more of the operations or features described and/or illustrated herein.

I/O controller 435 generally represents any type or form of module capable of coordinating and/or controlling the input and output functions of a computing device. For example, in certain embodiments I/O controller 435 may control or facilitate transfer of data between one or more elements of computing system 400, such as processor 65, system memory 70, communication interface 445, display adapter 415, input interface 425, and storage interface 440.

Communication interface 445 broadly represents any type or form of communication device or adapter capable of facilitating communication between computing system 400 and one or more additional devices. For example, in certain embodiments communication interface 445 may facilitate communication between computing system 400 and a private or public network including additional computing systems. Examples of communication interface 445 include, without limitation, a wired network interface (such as a network interface card), a wireless network interface (such as a wireless network interface card), a modem, and any other suitable interface. In at least one embodiment, communication interface 445 may provide a direct connection to a remote server via a direct link to a network, such as the Internet. Communication interface 445 may also indirectly provide such a connection through, for example, a local area network (such as an Ethernet network), a personal area network, a telephone or cable network, a cellular telephone connection, a satellite data connection, or any other suitable connection.

In certain embodiments, communication interface 445 may also represent a host adapter configured to facilitate communication between computing system 400 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Serial Advanced Technology Attachment (SATA), Serial Attached SCSI (SAS), and external SATA (eSATA) host adapters, Advanced Technology Attachment (ATA) and Parallel ATA (PATA) host adapters, Fibre Channel interface adapters, Ethernet adapters, or the like.

Communication interface 445 may also allow computing system 400 to engage in distributed or remote computing. For example, communication interface 445 may receive instructions from a remote device or send instructions to a remote device for execution.

As illustrated in FIG. 4, computing system 400 may also include at least one display device 410 coupled to communication infrastructure 405 via a display adapter 415. Display device 410 generally represents any type or form of device capable of visually displaying information forwarded by display adapter 415. Similarly, display adapter 415 generally represents any type or form of device configured to forward graphics, text, and other data from communication infrastructure 405 (or from a frame buffer, as known in the art) for display on display device 410.

As illustrated in FIG. 4, computing system 400 may also include at least one input device 430 coupled to communication infrastructure 405 via an input interface 425. Input device 430 generally represents any type or form of input device capable of providing input, either computer or human generated, to computing system 400. Examples of input device 430 include, without limitation, a keyboard, a pointing device, a speech recognition device, or any other input device.

As illustrated in FIG. 4, computing system 400 may also include a network attached storage device 40 and a sequential access media device 10 coupled to communication infrastructure 405 via a storage interface 440. Devices 40 and 10 generally represent any type or form of storage device or medium capable of storing data and/or other computer-readable instructions. For example, devices 40 and 10 may each include a magnetic disk drive (e.g., a so-called hard drive), a floppy disk drive, a magnetic tape drive, an optical disk drive, a flash drive, or the like. Storage interface 440 generally represents any type or form of interface or device for transferring and/or transmitting data between storage devices 40 and 10 and other components of computing system 400.

In certain embodiments, devices 40 and 10 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Devices 40 and 10 may also include other similar structures or devices for allowing computer software, data, or other computer-readable instructions to be loaded into computing system 400. For example, devices 40 and 10 may be configured to read and write software, data, or other computer-readable information. Devices 40 and 10 may also be a part of computing system 400 or may be a separate device accessed through other interface systems.

Many other devices or subsystems may be connected to computing system 400. Conversely, all of the components and devices illustrated in FIG. 4 need not be present to practice the embodiments described and/or illustrated herein. The devices and subsystems referenced above may also be interconnected in different ways from that shown in FIG. 4.

Computing system 400 may also employ any number of software, firmware, and/or hardware configurations. For example, one or more of the embodiments disclosed herein may be encoded as a computer program (also referred to as computer software, software applications, computer-readable instructions, or computer control logic) on a computer-readable storage medium. Examples of computer-readable storage media include magnetic-storage media (e.g., hard disk drives and floppy disks), optical-storage media (e.g., CD- or DVD-ROMs), electronic-storage media (e.g., solid-state drives and flash media), and the like. Such computer programs can also be transferred to computing system 500 for storage in memory via a network such as the Internet or upon a carrier medium.

The computer-readable medium containing the computer program may be loaded into computing system 400. All or a portion of the computer program stored on the computer-readable medium may then be stored in system memory 70, memory 25(1) and/or various portions of devices 40, 20(1), 20(2) or 10. When executed by processor 65, a computer program loaded into computing system 400 may cause processor 65 to perform and/or be a means for performing the functions of one or more of the embodiments described and/or illustrated herein. Additionally or alternatively, one or more of the embodiments described and/or illustrated herein may be implemented in firmware and/or hardware. For example, computing system 400 may be configured as an application specific integrated circuit (ASIC) adapted to implement one or more of the embodiments disclosed herein.

An Example Networking Environment

Figure 5:
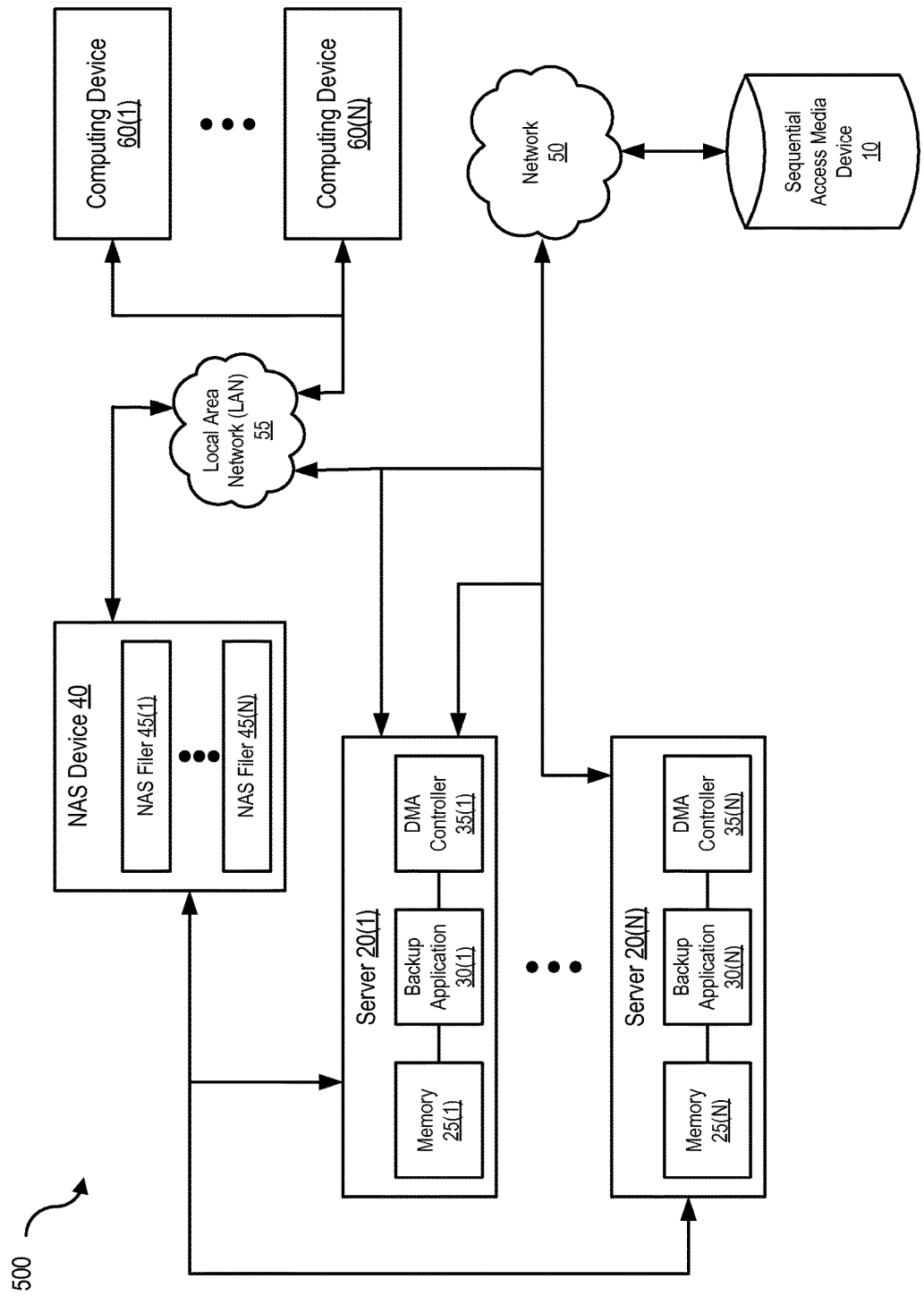
FIG. 5 is a block diagram of a networked system, illustrating how various computing devices can communicate via a network, according to one embodiment of the present invention.

FIG. 5 is a block diagram of a network architecture 500 in which server 20(1), sequential access media device 10 and NAS device 40 may be coupled to network 50. As illustrated in FIG. 5, sequential access media device 10 may be attached to server 20(1) through network 50. In certain embodiments, network-attached storage (NAS) devices may be configured to communicate with servers 20(1)-(N) using various protocols, such as Network File System (NFS), Server Message Block (SMB), or Common Internet File System (CIFS).

Servers 20(1)-(N) may also be connected to a network 50. Network 50 generally represents any type or form of computer network or architecture capable of facilitating communication between multiple computing devices. Network 50 may facilitate communication between servers 20(1)-(N) and a plurality of sequential access media devices. In certain embodiments, and with reference to computing system 400 of FIG. 4, a communication interface, such as communication interface 445 in FIG. 4, may be used to provide connectivity between server 20(1) and network 50. It should be noted that the embodiments described and/or illustrated herein are not limited to the Internet or any particular network-based environment. For example, network 50 can be a Storage Area Network (SAN).

In at least one embodiment, all or a portion of one or more of the embodiments disclosed herein may be encoded as a computer program and loaded onto and executed by servers 20(1)-(N), sequential access media device 10 or any combination thereof. All or a portion of one or more of the embodiments disclosed herein may also be encoded as a computer program, stored in servers 20(1)-(N), computing devices 60(1)-(N), and distributed over network 50.

In some examples, all or a portion of the computing devices in FIGS. 1A and 1B may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In addition, one or more of the components described herein may transform data, physical devices, and/or representations of physical devices from one form to another. For example, a pseudo-identity module may transform behavior of a server in order to cause the server and a sequential access media device to communicate with a NAS device.

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

What is claimed is:

1. A method comprising:
    creating a plurality of identities of a sequential access media device on a server;
    allocating a corresponding portion of a memory of the server to each respective identity of the plurality of identities of the sequential access media device;
    writing data from a plurality of backup data streams from an intermediary network attached storage (NAS) device to each allocated portion of the memory; and
    multiplexing data written to each allocated portion of the memory for transmission to the sequential access media device for storage, wherein
        the multiplexing comprises
            dedicating a direct memory access (DMA) channel of a plurality of DMA channels to each backup data stream of the plurality of backup data streams,
            assigning an allocated portion of the memory to the DMA channel, and
            mapping the memory to the sequential access media device.

2. The method of claim 1, wherein
    the allocated portion of the memory is assigned based on an association between a backup data stream of the plurality of backup data streams written to the allocated portion and the DMA channel of the plurality of DMA channels dedicated to the backup data stream, and
    the multiplexing further comprises
        writing a packet identifier associated with the backup data stream dedicated to the DMA channel to the memory.

3. The method of claim 2, wherein the memory of the server comprises:
    a front end coupled to the intermediary NAS device for identifying which NDMP filer each backup data stream from the intermediary NAS device is associated with; and
    a back end coupled to the sequential access media device and mapped to the DMA channel dedicated to the backup data stream.

4. The method of claim 1, comprising:
    coupling the server and the intermediary NAS device through a network;
    coupling the sequential access media device and the server through the network;
    adding a network data management protocol (NDMP) filer as a network-connected agent in a backup application resident on the server;
    transmitting an identity of the sequential access media device to the NDMP filer over the network, wherein the identity of the sequential access media device is one of the plurality of identities; and
    transmitting the data to the sequential access media device using a DMA controller.

5. The method of claim 4, wherein
    an identity of a plurality of identities of the sequential access media device is discovered by the NDMP filer of the intermediary NAS device by virtue of the server receiving an NDMP command from the NDMP filer.

6. The method of claim 5, wherein
    a response from the server to the NDMP command from the NDMP filer comprises the identity of the plurality of identities of the sequential access media device allocated to the NDMP filer on the server.

7. The method of claim 1, wherein
    creating the plurality of identities of the sequential access media device on the server is performed at a transport level of the server instead of a disk level or a storage level of the server, and
    multiplexing data written to each allocated portion of the memory for transmission to the sequential access media device for storage is performed at a Peripheral Component Interconnect (PCI)-level of the memory of the server.

8. The method of claim 1, wherein
    a header is written to each block in the plurality of backup data streams before the data written to each allocated portion of the memory in the server is multiplexed and transmitted to the sequential access media device for storage.

9. A non-transitory computer readable storage medium comprising program instructions executable to:
    create a plurality of identities of a sequential access media device on a server;
    allocate a corresponding portion of a memory of the server to each respective identity of the plurality of identities of the sequential access media device;
    write data from a plurality of backup data streams from a an intermediary network attached storage (NAS) device to each allocated portion of the memory; and
    multiplex data written to each allocated portion of the memory for transmission to the sequential access media device for storage, wherein
        the program instructions executable to multiplex comprise further program instructions executable to
            dedicate a direct memory access (DMA) channel of a plurality of DMA channels to each backup data stream of the plurality of backup data streams,
            assign an allocated portion of the memory to the DMA channel, and
            map the memory to the sequential access media device.

10. The non-transitory computer readable storage medium of claim 9, wherein
    the allocated portion of the memory is assigned based on an association between a backup data stream of the plurality of backup data streams written to the allocated portion and the DMA channel of the plurality of DMA channels dedicated to the backup data stream, and
    the program instructions executable to multiplex comprise further program instructions executable to
        write a packet identifier associated with the backup data stream dedicated to the DMA channel to the memory.

11. The non-transitory computer readable storage medium of claim 10, wherein the memory of the server comprises:

a front end for identifying which NDMP filer each backup data stream from the intermediary NAS device is associated with; and a back end mapped to the DMA channel dedicated to the backup data stream.

12. The non-transitory computer readable storage medium of claim 9, further comprising:
coupling the server and the intermediary NAS device through a network,
coupling the sequential access media device and the server through the network,
adding a network data management protocol (NDMP) filer as a network-connected agent in a backup application resident on the server,
transmitting an identity of the sequential access media device to the NDMP filer over the network, wherein the identity of the sequential access media device is one of the plurality of identities, and
transmitting the multiplexed data to the sequential access media device using a DMA controller.

13. The non-transitory computer readable storage medium of claim 12, wherein
an identity of a plurality of identities of the sequential access media device is discovered by the NDMP filer of the intermediary NAS device by virtue of the server receiving an NDMP command from the NDMP filer.

14. The non-transitory computer readable storage medium of claim 13, wherein
a response from the server to the NDMP command from the NDMP filer comprises the identity of the plurality of identities of the sequential access media device allocated to the NDMP filer on the server.

15. The non-transitory computer readable storage medium of claim 9, wherein
creating the plurality of identities of the sequential access media device on the server is performed at a transport level of the server, and
multiplexing data written to each allocated portion of the memory for transmission to the sequential access media device for storage is a Peripheral Component Interconnect (PCI)-level multiplexing.

16. The non-transitory computer readable storage medium of claim 9, wherein
a header is written to each block in the plurality of backup data streams before the data written to each allocated portion of the memory in the server is multiplexed and transmitted to the sequential access media device for storage.

17. A system comprising:
one or more processors; and
a memory coupled to the one or more processors, wherein the memory stores program instructions executable by the one or more processors to
create a plurality of identities of a sequential access media device on a server,
allocate a corresponding portion of a memory of the server to each respective identity of the plurality of identities of the sequential access media device,
write data from a plurality of backup data streams from an intermediary network attached storage (NAS) device to each allocated portion of the memory, and
multiplex data written to each allocated portion of the memory for transmission to the sequential access media device for storage, wherein
the program instructions executable to multiplex comprise further program instructions executable to
dedicate a direct memory access (DMA) channel of a plurality of DMA channels to each backup data stream of the plurality of backup data streams,
assign an allocated portion of the memory to the DMA channel, and
map the memory to the sequential access media device.

18. The system of claim 17, wherein
the allocated portion of the memory is assigned based on an association between a backup data stream of the plurality of backup data streams written to the allocated portion and the DMA channel of the plurality of DMA channels dedicated to the backup data stream, and
the program instructions executable to multiplex comprise further program instructions executable to
write a packet identifier associated with the backup data stream dedicated to the DMA channel to the memory.

19. The system of claim 17, wherein the program instructions are further configured to:
couple the server and the intermediary NAS device through a network,
couple the sequential access media device and the server through the network,
add a network data management protocol (NDMP) filer as a network-connected agent in a backup application resident on the server,
transmit an identity of the sequential access media device to the NDMP filer over the network, wherein
the identity of the sequential access media device is one of the plurality of identities, and
transmit the data to the sequential access media device using a DMA controller.

20. The system of claim 17, wherein
a header is written to each block in the plurality of backup data streams before the data written to each allocated portion of the memory in the server is multiplexed and transmitted to the sequential access media device for storage.

21. A computer-implemented method comprising:
creating a plurality of identities of a sequential access media device on a server;
allocating a portion of a memory of the server to each respective identity of the plurality of identities of the sequential access media device;
writing data from a plurality of backup data streams from a network attached storage (NAS) device to each allocated portion of the memory;
multiplexing data written to each allocated portion of the memory for transmission to the sequential access media device for storage;
adding a network data management protocol (NDMP) filer as a network-connected agent in a backup application resident on the server;
receiving a request from the NDMP filer to transmit an identity of the plurality of identities of the sequential access media device;
transmitting the identity of the sequential access media device to the NDMP filer;
multiplexing data written to each allocated portion of the memory; and
transmitting the multiplexed data to the sequential access media device using a DMA controller.

22. A computer-implemented method comprising:
- allocating a direct memory access (DMA) channel to a backup data stream from a network data management protocol (NDMP) filer;
- allocating a portion of a memory of a server to the DMA channel;
- determining whether the server comprises a front end and a back end that are configured to perform identification of the backup data stream from the NDMP filer at the front end, and map the DMA channel to the back end;
- if the server comprises the front end and the back end that are configured to perform the identification,
  - bypassing writing the backup data stream to the memory when performing a backup operation, and reading the backup data stream from the memory;
- if the server does not comprise the front end and the back end that are configured,
  - writing a packet identifier associated with the backup data stream to the memory; and
- mapping the memory to a sequential access media device.

* * * * *